(12) United States Patent
Hollenstein et al.

(10) Patent No.: US 11,703,328 B2
(45) Date of Patent: Jul. 18, 2023

(54) AUTO-LENGTH POLE

(71) Applicant: LEICA GEOSYSTEMS AG, Heerbrugg (CH)

(72) Inventors: Walter Hollenstein, Dornbirn (AT); Markus Geser, Horn (CH); Josef Müller, Oberegg (CH); Oliver Faix, Diepoldsau (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 912 days.

(21) Appl. No.: 16/512,573

(22) Filed: Jul. 16, 2019

(65) Prior Publication Data

US 2020/0018598 A1 Jan. 16, 2020

(30) Foreign Application Priority Data

Jul. 16, 2018 (EP) ..................... 18183806

(51) Int. Cl.
*G01C 15/00* (2006.01)
*G01S 17/08* (2006.01)
*G01S 19/03* (2010.01)

(52) U.S. Cl.
CPC ............ *G01C 15/002* (2013.01); *G01S 17/08* (2013.01); *G01S 19/03* (2013.01)

(58) Field of Classification Search
CPC ........ G01C 15/002; G01S 19/03; G01S 17/08
See application file for complete search history.

(56) References Cited

U.S. PATENT DOCUMENTS

| | | | | |
|---|---|---|---|---|
| 6,076,267 A | * | 6/2000 | Gotoh | G01C 15/06 33/294 |
| 7,310,888 B2 | * | 12/2007 | Gilliland | E04G 21/1808 33/404 |
| 7,759,941 B2 | * | 7/2010 | Bosnar | G01V 13/00 324/334 |
| 10,113,871 B2 | * | 10/2018 | Ang | G01C 15/06 |
| 2017/0067740 A1 | | 3/2017 | Ang et al. | |

FOREIGN PATENT DOCUMENTS

| | | |
|---|---|---|
| EP | 3 139 127 A1 | 3/2017 |
| EP | 3 182 066 A1 | 6/2017 |

OTHER PUBLICATIONS

Extended Search Report dated Feb. 21, 2019 as received in Application No. 18183806.1.

* cited by examiner

*Primary Examiner* — Elias Desta
(74) *Attorney, Agent, or Firm* — Maschoff Brennan

(57) ABSTRACT

A surveying pole system comprising a surveying pole including two telescopic sections for providing length adjustability. At a first end of the surveying pole, a pointing tip is disposed for positioning on a target point of the environment. At a second end, a length reference point is disposed. The surveying pole also includes a locking mechanism for locking the length adjustability in respective lock-in positions. Each of the lock-in positions provides a corresponding distance between the pointing tip and the length reference point. A plurality of coded identifiers have a predetermined code associated with one of the lock-in positions. The surveying pole also includes a coded-identifier reader for reading the code of a respective coded identifier associated with the respective lock-in position, a communication device configured for transmitting a signal to a surveying instrument, wherein the signal is based at least on the read code.

20 Claims, 3 Drawing Sheets

AUTO-LENGTH POLE

CROSS-REFERENCE TO RELATED APPLICATIONS

This application claims priority to European Patent Application No. 18183806, filed on Jul. 16, 2018. The foregoing patent application are incorporated herein by reference.

FIELD OF THE INVENTION

The present invention relates to a surveying pole system suitable for measurements or stake-outs in the field of geodesy.

BACKGROUND TO THE INVENTION

In order to measure and/or stake-out terrain points, generic surveying pole systems can be used as equipment cooperating with Terrestrial Positioning Systems (TPS) or Global Navigation Satellite Systems (GNSS). The term surveying pole system refers at least to a surveying pole and a surveying pole with an outsourced (but connected) processing unit.

The position measurement of a target point to be measured or staked-out happens indirectly: with a TPS or a GNSS, a reference point on the surveying pole is measured for example by using a reflector or a GPS-antenna mounted thereon. Since a tip of the surveying pole is placed on the actual target point in the terrain, the position of this target point can be derived due to a determinable spatial relationship between the reference point and the tip of the pole. This approach particularly allows to measure or stake-out a point that could not be measured or staked-out directly due to an obstacle between the TPS or GNSS and the point.

To provide further flexibility for such obstacle workarounds, it is common to provide a length adjustability for the pole. Current solutions for the length determination of the adjusted pole are either manual reading from a tape measure or from a display of a sophisticated measurement system. Alternatively, the measurement system can automatically provide the measured length to a log or to a TPS. For this purpose, a telescopic structure of the pole usually provides not only the length adjustability, but also involves a scale for a manual reading or the measurement system. Such measurement systems rely on incremental measuring techniques.

The presented length determination solutions for surveying poles known from prior art have their downsides. Surveying poles having a scale allowing a user for manually reading off the adjusted length do fulfil requirements with regard to weight and technical simplicity, however, they do not fulfil requirements with regard to automation and, hence, time efficiency. Surveying system having a measurement system on the other side might provide a desired degree of automation, however, they are too heavy, technically complex, and require recurring calibrations for maintaining the needed accuracy.

OBJECT OF THE INVENTION

The present invention therefore provides an improved surveying pole system which is lightweight, simplified in technical complexity, provides a constantly high accuracy for length determinations over a long period of time, and is relatively simple to produce. A surveying pole system according to the invention allows for a convenient, easy, and yet accurate measurement or stake-out, and has a relatively low energy consumption which allows for longer battery lives and usability. Further, the surveying pole system according to the invention has a design which is robust, in particular shock-resistant.

SUMMARY OF THE INVENTION

Some aspects of the invention relate to a surveying pole system comprising a surveying pole, wherein the surveying pole comprises at least two telescopic sections configured for providing a length adjustability of the surveying pole, at a first end of the surveying pole, a pointing tip suitable for being positioned on a target point of the environment, at a second end of the surveying pole, a length reference point, a locking mechanism configured for locking the length adjustability in respective lock-in positions, wherein each of the lock-in positions provides a corresponding distance between the pointing tip and the length reference point, and unlocking the length adjustability, coded identifiers, wherein each of the coded identifiers has a predetermined code and is associated with one of the lock-in positions, a coded-identifier reader configured for, in each of the lock-in positions, reading the code of a respective coded identifier associated with the respective lock-in position, a communication device configured for transmitting a signal to a surveying instrument or to a surveying instrument controller, wherein the signal is based at least on the read code.

The surveying pole system may also comprise a coded-identifier decoder configured for decoding the read code and deriving from the decoded code at least one of a reference sign of the respective coded identifier and a distance corresponding to the respective lock-in position.

The signal may be based on at least one of a reference sign of the respective coded identifier and a value of the respective distance provided by the respective lock-in position associated to the respective coded identifier.

The signal may be based on at least one of the read code of the respective coded identifier, the coded-identifier reader not reading a code.

The lock-in positions may be extending spaced apart along a longitudinal axis of the surveying pole.

Unlocking the length adjustability may be based on exceeding a force threshold or on a push-button mechanism.

Locking the length adjustability may be based on a locking item snapping into a corresponding slot, or a magnetically caused force.

The surveying pole may comprise, arranged in a predetermined position relative to the length reference point, at least one of a reflector, a target object, and a Global Navigational Satellite System (GNSS) sensor.

The surveying pole system may also comprise a user interface configured for emitting an indicator based on whether a lock-in position is taken or not.

The surveying pole may further comprise at least one of an orientation sensor configured for determining an azimuth of the surveying pole and a tilt sensor configured for determining at least one of pitch and roll of the surveying pole.

The signal may be based on at least one of a determined azimuth, determined pitch, and a determined roll.

The communication device may be configured for at least one of transmitting the signal in response to a change in code read by the coded-identifier reader, transmitting the signal upon a request received by the communication device, and transmitting the signal periodically.

The code of the coded identifiers may be a Binary Code, in particular one of a Gray code, an Aiken code, and a BCD code.

Each of the coded-identifiers may comprise at least one of permanent magnets and electromagnets.

The surveying pole may comprise a power unit configured for at least one of supplying the coded-identifier reader and the communication device with electrical power, and generating electric power by converting the motive power of a length adjustment based on induction.

In one embodiment, each of the coded identifiers may comprise a hall sensor, wherein the coded-identifier reader comprises a evaluation unit (in particular a processor) connected to each of the hall sensors and a magnet exciting one of the hall sensors in each of the lock-in positions.

Another aspect relates to a surveying pole system comprising a surveying pole and a module attachable to the surveying pole, wherein the surveying pole comprises at least two telescopic sections configured for providing a length adjustability of the surveying pole, at a first end of the surveying pole, a pointing tip suitable for being positioned on a target point of the environment, at a second end of the surveying pole, a length reference point, a measuring system configured for generating a signal (in particular length data), wherein the signal are based on a distance between the pointing tip and the length reference point, a first power interface configured for receiving power for the measuring system, a first data interface configured for transmitting the signal, a dock configured for receiving the module, wherein the module comprises a dock-counterpart configured for fitting the dock (i.e. attachable onto the dock), a battery power supply, a second power interface configured for supplying power to the first power interface, a second data interface configured for receiving the signal from the first data interface, and a third data interface configured for transmitting the signal to an external device.

Said surveying pole system may further comprise a data logger, wherein the external device is or comprises the data logger. Alternatively, or additionally, said surveying pole system may further comprise a surveying instrument, wherein the external device is or comprises the surveying instrument.

The supplying and receiving between the first power interface and the second power interface is particularly based on Wireless Power Transfer (WPT).

The first power interface, the first data interface, the second power interface, and the second data interface may all be comprised by one multi-purpose interface.

BRIEF DESCRIPTION OF THE DRAWINGS

By way of example only, preferred embodiments of the invention will be described more fully hereinafter with reference to the accompanying figures, wherein.

DETAILED DESCRIPTION OF THE DRAWINGS

Figure 1:
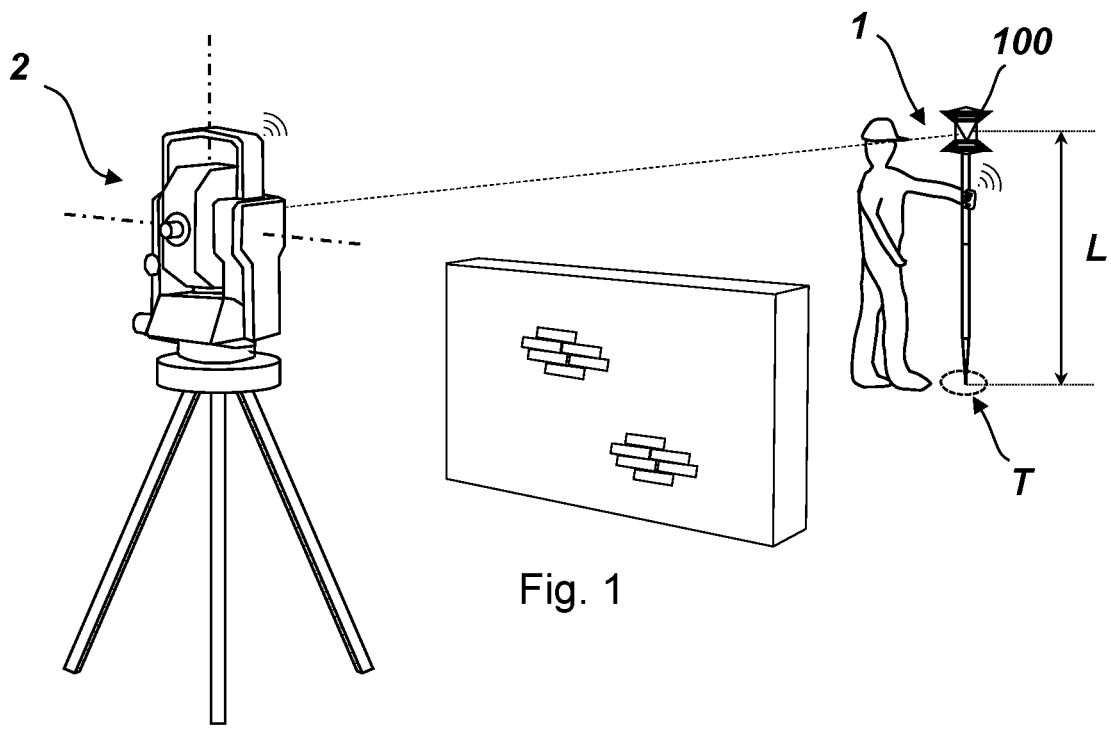
FIG. 1 shows a user performing a stake-out or a measurement of a target point T with a surveying pole system according to an embodiment of the invention.

The length-adjustable surveying pole provides its current length, that is the distance between the length reference point and the pointing tip P, based on a determination of discrete lock-in positions on the pole. The discrete positions may be arranged according to a grid element spacing, and a locking mechanism may be provided such that the moving part of the length-adjustable pole may be snapping into place at an according lock-in position.

The coded identifiers associated with the lock-in positions may be embodied as unique magnetic patterns. Each pattern may be a specific arrangement of e.g. four magnets. The coded-identifier reader may be facing one of the coded identifiers whenever a lock-in position has been taken. The coded-identifier reader may detect the magnetic field on this discrete position and therewith read the code of the coded identifier associated with the respective lock-in position. Instead of magnetism, the coded identifier and the coded-identifier reader may rely on other principles such as optical, inductive, or capacitive coding/decoding. For example, the surveying pole may comprise Hall sensors or inductive Coil sensors and changing patterns of magnet. The identifiers/reader arrangement may also base on a light projected onto changing mirrors, holes, colours, polarisation filters, etc. Analogously, in a capacitive solution, a change of charge can be detected by change of distance or a dielectric. Analogously, in an inductive solution, the identifiers embodied by coils or magnets can provide a code by changing of the iron material or the iron structure. The code of the identifiers can e.g. be a binary code such as one of Gray code, Aiken code, BCD code, or any other appropriate binary code.

An optional monitoring operating mode automatically detects a change of the adjusted length by periodically activating the reader. In case the read code has changed, the communication device may transmit a notification about the fact that the pole length has changed.

Advantageously, the accuracy of the pole length determination is not affected by a measurement certainty, but instead by the positioning precision of the identifiers and the reader at their predetermined positions, and by the precision of the locking mechanism.

Since the locking mechanism provides distinctive lock-in positions which are easily calibrateable, the length adjustment does not need to be measured accurately on every single change. Because of the simple and stiff arrangement of the components, the construction is very robust such that after the occurrence of a shock a reset or recalibration is not necessary. Also, when powering up the surveying pole, the length may be determinable without an initialisation process, e.g. comprising going to a home position.

A signal related to the read code of the identifier, in particular the current pole length, can be transmitted without user interaction once the length adjustment is applied. Alternatively, it could be transmitted permanently, i.e. repeatedly in a predetermined time interval, making it receivable for a surveying instrument, such as a total station.

FIG. 1 shows an exemplary measuring situation with a total station 2 and a surveying pole 1 involved. A user placed a pointing tip of the surveying pole 1 onto a target point T that he wants to measure or stake out, while a reflector 100 mounted at an upper end of the surveying pole 1 is tracked by the total station 2. The position of the reflector 100, i.e. the length reference point of the pole, is determinable by the total station 2, however the length L needs to be determined on side of the surveying pole 1 for which it has means to transmit a signal related to the determined length L (distance between tip P of the pole and reference point of the pole) to the total station 2.

For optionally further considering a tilt and/or an orientation of the surveying pole 1, a tilt sensor and/or an orientation sensor may be comprised by the surveying pole 1. The signal transmitted to the total station 2 may further be based on the determined tilt and/or orientation. Either of the optional tilt and orientation sensor may exemplarily comprise at least one of an acceleration sensor, a gyroscope, and a geomagnetic sensor. The extra information on the six degree of freedom state of the pole is for example useful in situations where the pole is tipped against a ceiling or a side wall. Accordingly, the signal transmitted from the pole may not only comprise information on the length L, but also on upside/down orientation relative to the gravity field, tilt information, delta position and delta orientation information during movement of the pole, and/or absolute positions of the pole.

The surveying pole system may comprise a coded-identifier decoder that interprets the read code of the coded identifier. This decoder may either be included in the surveying pole or it may be provided in the surveying instrument 2 or in another external device such as a controller of a surveying instrument. Given the case the decoder is not inside the pole, the decoder is connected to the communication device 13 of the pole.

In the shown situation, the wall might be one reason to deploy a surveying pole 1 because the direct line of sight between the surveying instrument 2 and the target point is blocked.

The communication device 13 may be configured for receiving a request/demand which triggers (a) the communication device to transmit a signal, and/or (b) the coded-identifier reader to read a code.

In a defined position relative to the length reference point there is arranged a reflector (such as a prism), a target object (such as a sphere, a cylinder, or a plate), and/or a GNSS sensor.

Figures 2A, 2B, 2C:
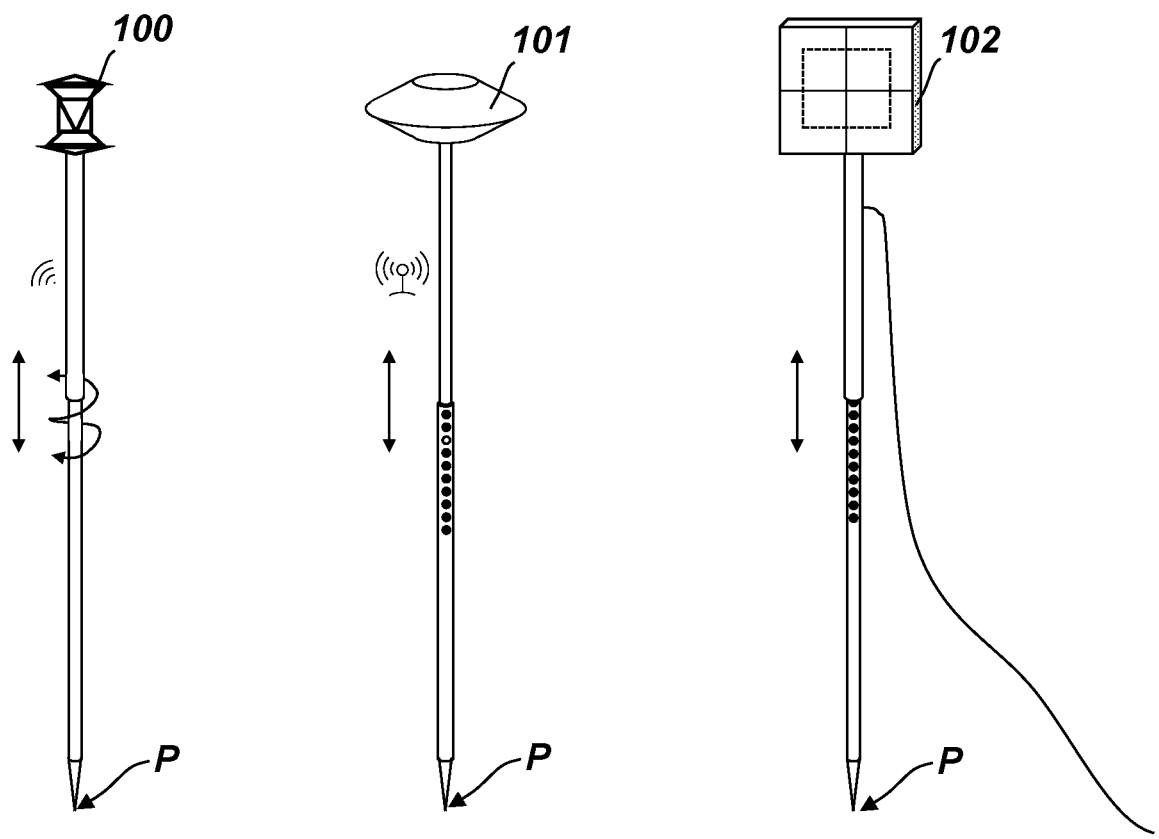
FIGS. 2a, 2b and 2c show three exemplary embodiments of a surveying pole according to the invention.

FIGS. 2a, 2b, and 2c show three exemplary alternative surveying pole designs, one having a retro-reflecting prism 100, another having a GNSS antenna 101, and the third one having a target plate 102 mounted at the length reference point. The signal transmitted to the surveying instrument may optionally further be based on the according type of equipment arranged at the reference point. For example, the signal may further comprise information on the target type being a prism, certain parameters of the target, and/or on an ID of the target.

The pole shown in FIG. 2b can be used for surveying as a standalone device since it is configured to locate their reference point (position of the GNSS antenna) independently on the basis of satellite signals.

The three shown poles also show alternative technologies which the communication device is based upon. As is indicated, the pole shown in FIG. 2a has a Wireless Network adapter designed to establish a connection to the external device. The pole of FIG. 2b has a mobile network module to communicate over cellular network, and the pole shown in FIG. 2c relies on a cable connection.

As is shown in FIGS. 2a, 2b, and 2c, also the length adjustment of the surveying pole can be realised in several ways. For example, as is shown on the pole with the reflector 100 in FIG. 2a, the upper telescopic pole section can be screwed onto the lower section (or vice-versa). Inside the mechanism, for example along the turns of a thread, there are lock-in positions and corresponding coded identifiers provided, wherein the coded-identifier reader is arranged such that it can read a coded identifier each time a lock-in position is occupied.

Alternatively, and as is shown on the pole with the GNSS antenna in FIG. 2b, the upper tube (section) may be thinner in order to be slidable into the lower tube. Further, slots may be machined into the thicker tube, wherein a push-button capable of snapping into the slots is based in the thinner tube. By pushing the button inside, the telescopic pole can be adjusted in length.

As is shown on the pole with the reflector target plate 102 in FIG. 2a, several lock-in positions of a locking mechanism can be provided by slots worked into the lower telescopic pole section, wherein the upper pole section is slidable over the lower section. For adjusting the length of the pole, for example, a threshold force needs to be exceeded.

Various mechanical snap-in solutions are applicable for this locking mechanism. Further, also locking mechanisms based on a magnetically induced force are possible to apply. For example, in the lock-in positions, a resistance caused by a magnetic force needs to be overcome for adjusting the pole length. Accordingly, the term 'mechanism' as used herein is not restricted to physical constructions, but also includes magnetic solutions.

The pole may have a power unit for supplying the coded-identifier reader and the communication device 13 with power. In the particular case the surveying pole also having a processing unit (coded-identifier decoder), this might as well be supplied by the power unit. The power unit may comprise at least one of a rechargeable or non-rechargeable battery, a power cable for obtaining electric power from an external source, and a power generator the latter being configured for "harvesting" electrical energy from the length adjustment. Such harvest could convert the motive power of a length adjustment based on induction.

In a specific embodiment, the coded identifiers make use of a magnetic coding as described herein and can at the same time be used for the lock-in mechanism in that their magnetic design induces the needed resistance force on side of the respective other pole section whenever a lock-in position is reached.

Figure 3:
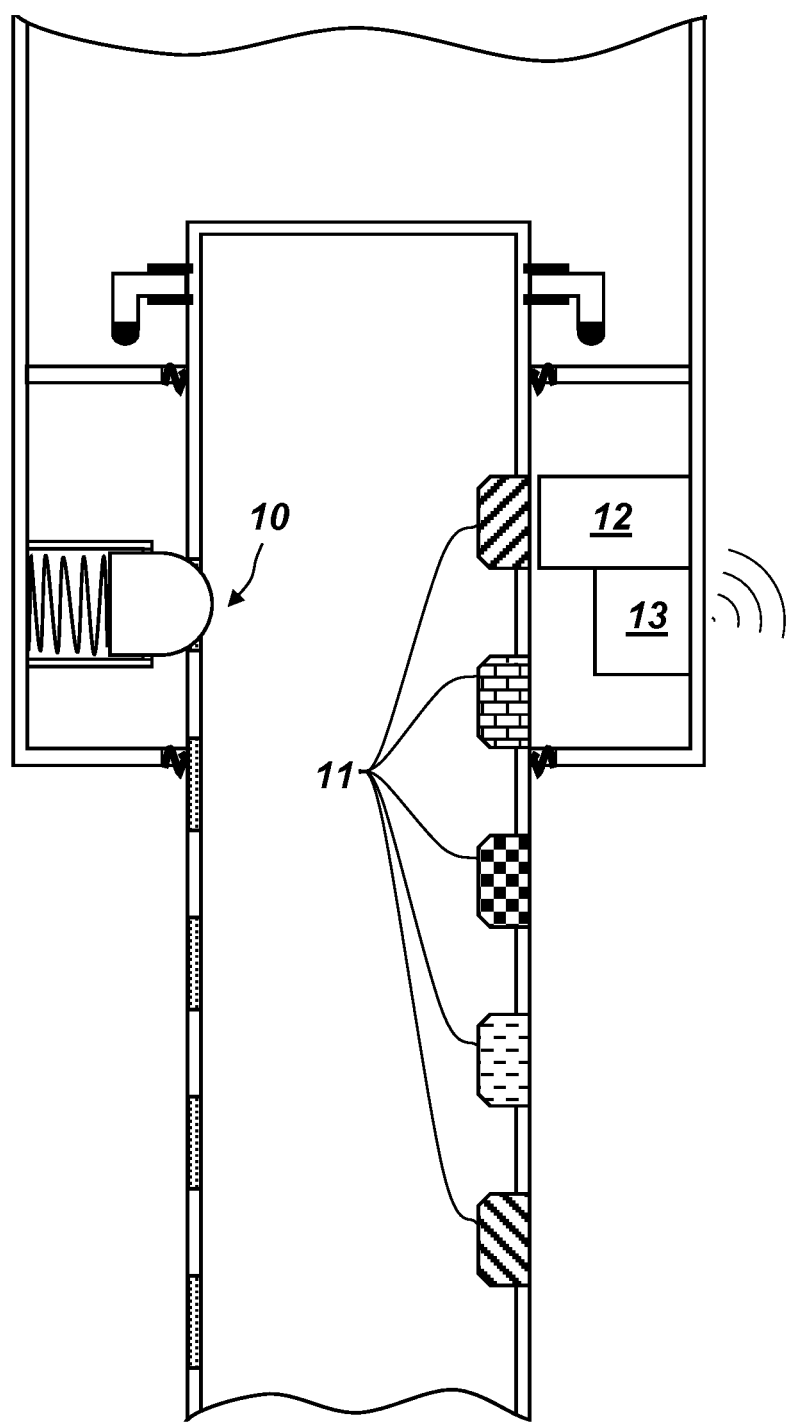
FIG. 3 shows a detailed view of an exemplary embodiment of the locking mechanism, the coded identifiers and the coded-identifier reader of a surveying pole system according to the invention.

FIG. 3 shows a section of a surveying pole with a detailed view of the locking mechanism 10, the coded identifiers 11, the coded-identifier reader 12, and the communication device 13. FIG. 3 may be considered a detailed view of the locking mechanism of the surveying pole in FIG. 2c. A snap-in mechanism is realised with a hemispheric body as physical locking item being pre-stressed by a spring. Upon applying a force for adjusting the length, the hemispheric body is pushed radially outwards against the preload until the body is leaving the slot, therewith unlocking the length adjustability. In the next lock-in position, the hemispheric body snaps into the next slot, therewith locking the length adjustability in another lock-in position.

The coded identifiers 11 are arranged in the surface of the lower pole section and the coded-identifier reader 12 is arranged in the upper pole section. The coded-identifier reader 12 is connected to the communication device 13.

Every time a lock-in position is taken, i.e. the hemispheric body latches into the slot, in particular in a self-centring manner, one of the coded identifiers 11 is aligned with the coded-identifier reader 12. The locking mechanism 10, the coded identifier 11 and the coded-identifier reader 12 are positioned and designed such that each of the identifiers 11 is assigned to a respective lock-in position and readable by the reader 12 in the lock-in position.

The reader 12 is configured for reading the code of the associated identifier. The communication device 13 is configured for transmitting wireless signals based on the read code, in this case a signal representing the read code itself. The signal can be received by a coded-identifier decoder comprised by the surveying instrument 2. The decoder is configured for decoding the read code and deriving therefrom a reference sign of the respective identifier and/or a distance value corresponding to the respective identifier/lock-in-position. A reference sign may be a plain numbering of the lock-in positions, wherein each number is assigned to a predetermined distance between the pole tip and the reference point. In other embodiments, the pole 1 itself may have included the coded-identifier decoder, wherein the communication device 13 would transmit a reference sign and/or a distance value derived from the code that is provided by the reader 12.

In further embodiments, the communication device 13 may also transmit tilt data determined by a tilt sensor optionally comprised by the pole 1 and/or orientation data determined by an orientation sensor optionally comprised by the pole 1. In another embodiment, a signal is transmitted in case the reader 12 is reading a new code, i.e. in case a change event happens. Further embodiments of the surveying pole system provide a user interface (e.g. a lamp, a display, a loudspeaker, or the like) for generating a warning signal for the user of the pole, said warning signal indicating that the length adjustment did not come to rest in a lock-in position (so that no length determination can take place). Also, the signal transmitted by the communication device may also be based on the fact that no lock-in position is occupied, i.e. that no code can be read at the moment. In this case, the surveying instrument is getting the warning that no length detection can be initiated. The communication device may also be designed to receive a trigger signal for inducing a code reading and a subsequent transmission of a signal based on the read code.

Figure 4:
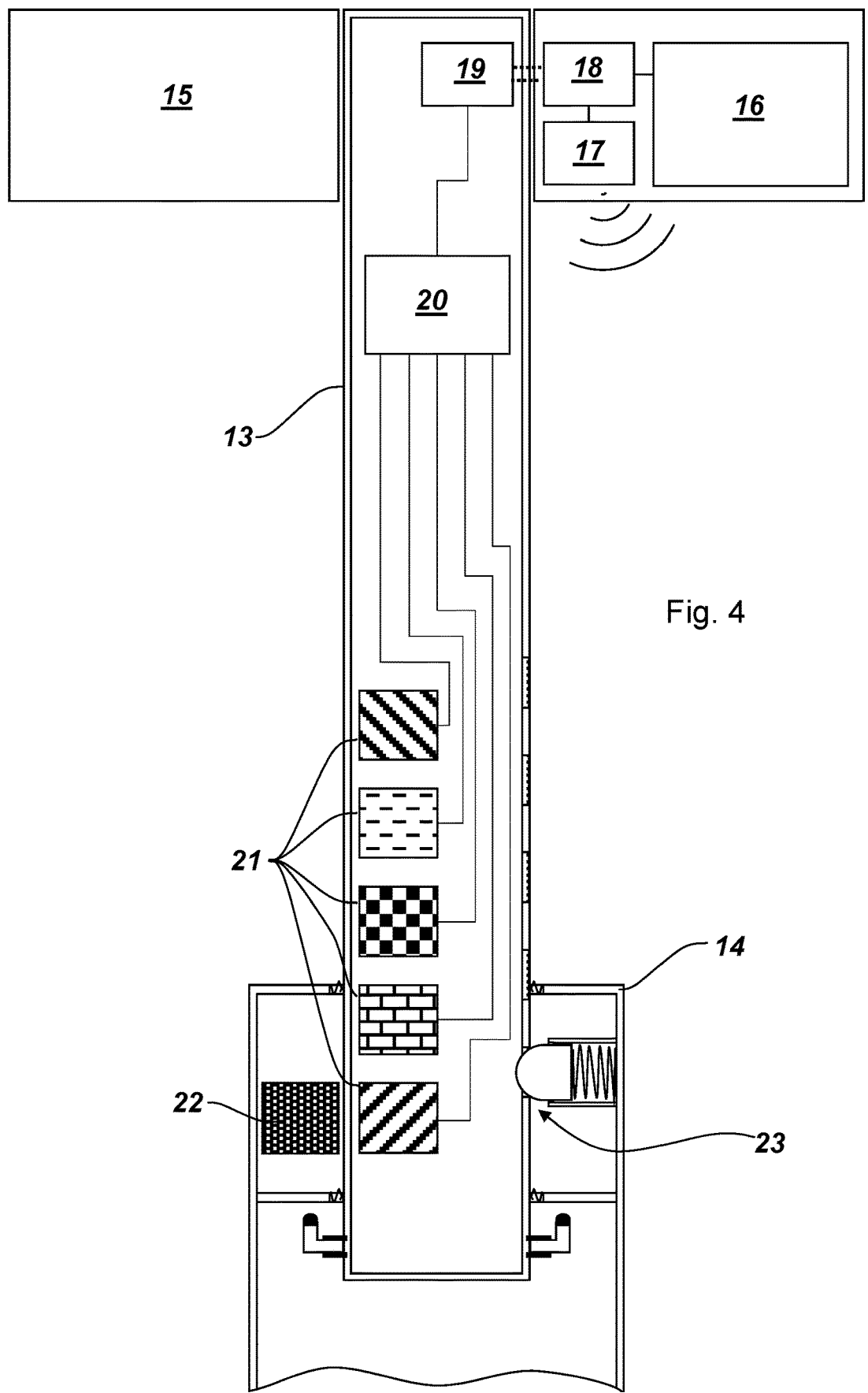
FIG. 4 shows a detailed view of another embodiment of the coded identifiers and the coded-identifier reader of a surveying pole system according to the invention as well as module for supporting the passive surveying pole.

FIG. 4 shows a further embodiment of a surveying system. In this example, the upper telescopic section 13 is slidable in the lower telescopic section 14 (as opposed to the embodiment from FIG. 3). A donut-shaped module 15 can be attached to the pole at the top. Further units may follow above (not shown), such as the targets 100, 101, and 102 from FIGS. 2*a-c* for example. This module has a battery pack 16 (battery power supply) and a wireless communication unit 17 (third data interface). Both battery 16 and communicator 17 are connected to an NFC-unit 18 (second power/data interface), over which at least electric power can be provided and signals can be received.

The module 15 being attached to the dock of the pole with its dock-counterpart is fitted such that the NFC-unit 18 is within reach of a counter-NFC-unit 19 (first power/data interface). The dock is the upper end of the upper pole section itself and the dock-counterpart is the middle recess of the donut-shaped module in this example. The counter-NFC-unit 19 is at least configured to receive power and transmit signals.

Shown is also an embodiment of the coded identifiers, which here comprise hall sensors 21. The hall sensors 21 each have a unique address or ID by which they are distinguishable from each other. The coded-identifier reader here is embodied as a processor 20 and a magnet 22. The magnet 22 excites in each of the lock-in positions a different hall sensor. Depending on which of the hall sensors 21 indicates through the wire connection to the processor 20 that it is excited by the magnet 22, it can be derived what is the current distance between the pointing tip and the and the length reference point. In particular, the processor 20 can communicate this result also through a wire connection to the counter-NFC-unit 19 over which it is transferred to the NFC-unit 18 of the module. From there it continues to the communication unit 17 over which it can be distributed, e.g. to an external device, such as a data logger or a surveying instrument.

In particular, the signals are length data, wherein the length data can either express the distance between the pointing tip and the length reference point directly, or be indicative for it, that is for example the distance can be derived based on which lock-in position or which hall sensor was detected.

The aspect of the module on the one hand and the embodiment of the coded identifier and the coded-identifier reader on the other hand are independent from each other.

With the attachable module, the pole can be designed entirely passive, i.e. it does not have any power supply whatsoever. When the module is attached, the pole is supplied over the wireless power transfer (WPT) established via the NFC modules. Other wireless technologies are however also applicable. The communicator 17 can be based on Bluetooth or similar technology. The interfaces (power and signals) are each shown here combined in one multi-purpose interface (19 on the one side and 18 on the other). However, they can also be embodied physically separately from each other.

Although the invention is illustrated above, partly with reference to some preferred embodiments, it must be understood that numerous modifications and combinations of different features of the embodiments can be made. All of these modifications lie within the scope of the appended claims. In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc. The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching.

Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention. In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

The invention claimed is:

1. A surveying pole system comprising:
   a surveying pole including:
      at least two telescopic sections configured for providing a length adjustability of the surveying pole, at a first end of the surveying pole, a pointing tip suitable for being positioned on a target point of the environment, at a second end of the surveying pole, a length reference point, a locking mechanism configured for locking the length adjustability in respective lock-in positions, wherein each of the lock-in positions provides a corresponding distance between the pointing tip and the length reference point, and unlocking the length adjustability, coded identifiers, wherein each of the coded identifiers has a predetermined code and is associated with one of the lock-in positions, a coded-identifier reader configured for, in each of the lock-in positions, reading the code of a respective coded identifier associated with the respective lock-in position, a communication device configured for transmitting a signal to a surveying instrument or to a surveying instrument controller, wherein the signal is based at least on the read code.

2. The surveying pole system according to claim 1, comprising:

a coded-identifier decoder configured for:

decoding the read code, and deriving from the decoded code at least one of:

a reference sign of the respective coded identifier, and a distance corresponding to the respective lock-in position.

3. The surveying pole system according to claim 2, wherein the signal is based on at least one of:

a reference sign of the respective coded identifier, and a value of the respective distance provided by the respective lock-in position associated to the respective coded identifier.

4. The surveying pole system according to claim 1, wherein the signal is based on at least one of:

the read code of the respective coded identifier, and the coded-identifier reader not reading a code.

5. The surveying pole system according to claim 1, wherein the lock-in positions extend spaced apart along a longitudinal axis of the surveying pole.

6. The surveying pole system according to claim 1, wherein unlocking the length adjustability is based on:

exceeding a force threshold, or on a push-button mechanism.

7. The surveying pole system according to claim 1, wherein locking the length adjustability is based on:

a locking item snapping into a corresponding slot, or a magnetically caused force.

8. The surveying pole system according to claim 1, wherein the surveying pole comprises, arranged in a predetermined position relative to the length reference point, at least one of:

a reflector, a target object, and a Global Navigational Satellite System (GNSS) sensor.

9. The surveying pole system according to claim 1, further comprising a user interface configured for emitting an indicator based on whether a lock-in position is taken or not.

10. The surveying pole system according to claim 1, wherein the surveying pole comprises at least one of:

an orientation sensor configured for determining an azimuth of the surveying pole, and a tilt sensor configured for determining at least one of pitch and roll of the surveying pole.

11. The surveying pole system according to claim 10, wherein the signal is based on at least one of:

a determined azimuth, a determined pitch, and a determined roll.

12. The surveying pole system according to claim 1, wherein the communication device is configured for at least one of:

transmitting the signal in response to a change in code read by the coded-identifier reader, transmitting the signal upon a request received by the communication device, and transmitting the signal periodically.

13. The surveying pole system according to claim 1, wherein the code of the coded identifiers is a Binary Code.

14. The surveying pole system according to claim 1, wherein each of the coded-identifiers comprises at least one of permanent magnets and electromagnets.

15. The surveying pole system according to claim 1, wherein the surveying pole comprises a power unit configured for at least one of:

supplying the coded-identifier reader and the communication device with electrical power, and generating electric power by converting the motive power of a length adjustment based on induction.

16. The surveying pole system according to claim 1, wherein each of the coded identifiers comprises a hall sensor, and wherein the coded-identifier reader comprises an evaluation unit connected to each of the hall sensors and a magnet exciting one of the hall sensors in each of the lock-in positions.

17. A surveying pole system comprising:

a surveying pole including:

at least two telescopic sections configured for providing a length adjustability of the surveying pole, at a first end of the surveying pole, a pointing tip suitable for being positioned on a target point of the environment, at a second end of the surveying pole, a length reference point, a measuring system configured for generating a signal, wherein the signal is based on a distance between the pointing tip and the length reference point, a first power interface configured for receiving power for the measuring system, a first data interface configured for transmitting the signal; and a module attachable to the surveying pole including:

a dock-counterpart configured for fitting the dock, a battery power supply, a second power interface configured for supplying power to the first power interface, a second data interface configured for receiving the signal from the first data interface, and a third data interface configured for transmitting the signal to an external device wherein the surveying pole further comprises:

a dock configured for receiving the module.

18. The surveying pole system according to claim 17, further comprising a data logger, wherein the external device is the data logger.

19. The surveying pole system according to claim 17, further comprising a surveying instrument, wherein the external device is the surveying instrument.

20. The surveying pole system according to claim 17, wherein the supplying and receiving between the first power interface and the second power interface is based on Wireless Power Transfer (WPT).

* * * * *